United States Patent [19]

Osborn et al.

[11] 3,996,134
[45] Dec. 7, 1976

[54] METHOD OF DISPERSING OIL IN WATER

[75] Inventors: Peter George Osborn, Bourne End;
Peter Francis Nicks, Maidenhead;
Michael George Norton,
Burnham-on-Crouch, all of England

[73] Assignee: Imperial Chemical Industries Limited, London, England

[22] Filed: Dec. 13, 1974

[21] Appl. No.: 532,692

[30] Foreign Application Priority Data

Jan. 17, 1974 United Kingdom ............... 2192/74
Apr. 24, 1974 United Kingdom ............. 17883/74

[52] U.S. Cl. ........................... 210/59; 210/DIG. 27; 252/351
[51] Int. Cl.² ........................................... C02B 9/02
[58] Field of Search ............... 210/59, 40, DIG. 27; 252/312, 311, 358, 331, 335, 351; 260/29.2 E, 31.2 XA, 33.2 R, 33.4 R

[56] References Cited

UNITED STATES PATENTS

| | | | |
|---|---|---|---|
| 3,310,512 | 3/1967 | Curtice | 260/29.2 E |
| 3,639,255 | 2/1972 | Boardman et al. | 210/59 |
| 3,699,065 | 10/1972 | Clark | 260/29.2 E |
| 3,810,835 | 5/1974 | Ferm | 210/59 |
| 3,941,694 | 3/1976 | Scott | 210/59 |

FOREIGN PATENTS OR APPLICATIONS 1,208,905  10/1970  United Kingdom ........... 260/29.2 E

*Primary Examiner*—Charles N. Hart
*Assistant Examiner*—Benoit Castel
*Attorney, Agent, or Firm*—Cushman, Darby & Cushman

[57] ABSTRACT

A method of dispersing oil in water, particularly useful in oil slick dispersion, secondary oil recovery and tar-sand oil recovery comprises contacting the oil and water with an alkyd resin in which one component of the resin is the residue of a water-soluble polyalkylene glycol such as a polyethylene glycol.

13 Claims, No Drawings

METHOD OF DISPERSING OIL IN WATER

The present invention relates to a method of dispersing oil in water.

The problem of dispersing oil in water is one which has received increasing attention in recent years. More and more oil is transported around the world and accidental or deliberate spillages of the oil result in ugly and offensive slicks of oil on the water surface. Thus, the oil spillage can arise through damage to the carrier vessel or through tank washings being jettisoned into the sea. One method of disposing of the oil slicks is to disperse the oil in water as fine and stable droplets which are then less of a hazard to bird and marine life and which are more readily broken down by microbiological action. For dispersion to be effective, however, it is necessary to use a very efficient dispersing agent which has long lasting action so that the oil droplets do not readily re-agglomerate to a slick. The present invention provides a method of dispersing oil slicks which is efficient and in which the dispersed oil droplets do not readily coalesce. The method of the invention is not, however, limited to this one use, important though it is, and as will be apparent from the subsequent disclosure in this specification other uses are envisaged for the method and associated compositions.

According to the invention a method of dispersing oil in water comprises contacting the oil and water with an alkyd resin in which one component of said resin comprises the residue of a polyalkylene glycol, said polyalkylene glycol being soluble in water.

By "soluble in water" we mean that at the temperature at which the alkyd is used to disperse the oil in water the polyalkylene glycol, which forms a component of the resin, would be below its cloud point.

Alkyd resins generally are the condensation products of a polybasic acid, a polyhydric alcohol and usually, a monobasic acid. The alkyd resins useful in the present invention preferably comprise the water-soluble polyalkylene glycol as at least a part of the polyhydric alcohol component. Additional polyhydric alcohols which may be used include diols suitable containing up to 20 carbon atoms, such as mono, di- and tri-ethylene glycol, mono-, di- and tri-propylene glycol, mono-, di- and tri-butylene glycol, and neopentyl glycol; water-insoluble polyglycols such as polypropylene glycol and polybutylene glycol; triols suitably containing up to 20 carbon atoms such as glycerol, trimethylol propane and trimethylol ethane; and polyols also suitably containing up to 20 carbon atoms such as pentaerythritol, dipentaerythritol and sorbitol.

The polybasic acid component of the alkyd resin may be saturated, or unsaturated either by olefinic or aromatic unsaturation. Commonly used acids are aliphatic or aromatic dibasic acids containing up to 20 carbon atoms, preferably up to 10 carbon atoms such as ortho-, iso or terephthalic acid, maleic acid, fumaric acid, itaconic acid, mesaconic acid, citraconic acid, azelaic acid, succinic acid, adipic acid, glutaric acid or suberic acid. The polybasic acid may also be tribasic, suitably an aromatic acid containing up to 20, preferably up to 10 carbon atoms, e.g. trimellitic acid or pyromellitic acid.

The optional monobasic acid component of the alkyd resin, which functions as a monofunctional chain terminator, may be derived from a free acid or from an ester of the acid, particularly a glyceride. The acid may be an aromatic acid, particularly an alkyl substituted benzoic acid but is suitably an aliphatic saturated or ethylenically unsaturated acid containing up to 30 carbon atoms, preferably 6 to 22 carbon atoms. Mixtures of acids or their esters may also be used to derive the monobasic acid component, particularly naturally occurring mixtures such as tall oil acids, or acids derived from linseed oil, soyabean oil, soya oil, whale oil, dehydrated castor oil, tung oil, fish oil, safflower oil, oiticica oil, cottonseed oil or coconut oil. Individual acids which are acceptable include isooctanoic acid, 2-ethylhexanoic acid, isodecanoic acid, lauric acid and pelargonic acid. Other mono-basic acid chain terminators known to those expert in the field may also be used as may monohydric alcohol chain terminators which are also known for this purpose, e.g. $C_1$ to $C_{20}$ alkanols.

"Polyalkylene glycol" is the general name for polymers of an alkylene glycol which have the general formula

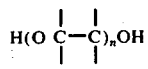

where the structure

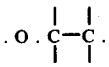

is derived from an olefine oxide and forms a polyoxyalkylene chain. For example polyethylene glycol $H(OCH_2CH_2)_nOH$ is derived from ethylene oxide

The water-soluble polyalkylene glycol is preferably polyethylene glycol but low molecular weight polypropylene glycol or polyalkylene glycols containing a major proportion of ethyleneoxy groups together with minor proportions of randomly distributed propyleneoxy and/or butyleneoxy groups may also be used. In addition to the water-soluble polyalkylene glycol residue the alkyd resin may contain residues of one or more water-insoluble polyalkylene glycols such as those of higher molecular weight polypropylene or polybutylene glycols. Furthermore the alkyd resin may contain residues of one or more polyalkylene glycols containing water-soluble polyalkyleneoxy blocks together with water insoluble polyalkyleneoxy blocks, for example polyethyleneoxy/polypropyleneoxy block copolymers (poly(ethylene/propylene) glycol).

The alkyd resin contains at least 5% by weight of the resin of the polyalkylene glycol and, more suitably, at least 10%. For preference the alkyd resin contains 25 to 85% by weight of the polyalkylene glycol.

The water-soluble polyalkylene glycol which forms a part of the alkyd resin preferably has a molecular weight in the range 100 to 10,000, more preferably 400 to 5,000. One of the terminal hydroxyl groups of the polyalkylene glycol incorporated in the resin may, if desired, be etherified, e.g. with a lower ($C_1$ to $C_6$) alcohol such as methanol or ethanol.

Alkyd resins which are useful in the present invention may be prepared by reacting a carboxyl or ester group containing alkyd resin with the hydroxyl-terminated polyalkylene glycol by a standard esterification or transesterification technique. Alternatively the alkyd resin may be prepared from ingredients, one or more of which comprise the polyalkylene glycol unit. For example, a polyol such as glycerol may be reacted with an olefine oxide such as ethylene oxide so that the glycerol —OH groups react to product what is in effect a glycerol/polyethylene glycol ether. This product is then reacted with the polybasic acid and optional monobasic acid under esterification conditions to form the alkyd. Similarly, a polybasic acid may be reacted with an olefine oxide to form the ester of the polyalkylene glycol and provided that it has been ensured that the polybasic acid retains one or more free —COOH groups it may be used in the alkyd forming reaction. In a third method of preparation the alkyd resin may be prepared from its basic ingredients in which the polyalkylene glycol forms one of such ingredients. It is preferred that the alkyd resin forming reaction is taken as near completion as possible i.e. as near to gel point as is practicable. Usually the product has a low final acid value, e.g. less than 30 mg. KOH/gram.

In practice the method of the present invention may conveniently be accomplished by applying to the oil and water a composition comprising an alkyd resin as hereinbefore defined dissolved or dispersed in an inert liquid carrier.

Suitable inert liquid carriers include hydrocarbons, particularly aliphatic hydrocarbons and cycloaliphatic hydrocarbons containing 6 to 20 carbon atoms. It is convenient to use hydrocarbon fractions of petroleum origin containing aromatic, aliphatic and cycloaliphatic hydrocarbons such as kerosene or gas oil. When the composition is to be used for oil slick dispersion it is preferred that the aromatics content of the fraction be low since aromatic hydrocarbons are poisonous to marine life. Thus, the aromatics content should be less than 30% by weight, more preferably less than 5% by weight. Various hydrocarbon esters, ethers or alcohols provide particularly effective liquid carriers especially $C_6$ to $C_{30}$ esters, ethers or alcohols, e.g. di-isooctylether, iso-octanol, isodecanol, octyloctanoate or tetradecylacetate. Ethers and esters are in general preferred for oil slick dispersion because they have a minimal effect on marine life. Mixtures of such ethers, esters and alcohols are often obtained as by-products in the hydroformylation of olefines, e.g. $C_6$ to $C_{13}$ olefines and such mixtures are effective carriers for use in the compositions according to the invention, either in the crude state or after treatment to reduce any contamination by trace metals and/or to reduce their alcohol content (e.g. by distillation, extraction or absorption treatments). Other ethers which may be used include the glycol ethers, particulary the lower ($C_1$ to $C_6$) ethers of ethylene or propylene glycol, and ethers obtained by reacting an alcohol, particularly a $C_1$ to $C_6$ alkanol, with one or more molecules of an olefine oxide such as ethylene oxide and/or propylene oxide. For oil slick dispersion the amount of alkyd resin in the inert liquid carrier is preferably 5 to 75% by weight and suitably up to 20% by weight of the alkyd resin, based on the oil to be dispersed, may be applied to the oil and water. Preferably 0.1 to 15%, more preferably 0.5 to 10% by weight is applied.

Apart from their use in dispersing oil slicks the alkyds may also be used to disperse oil in water in secondary oil recovery, recovery of oil from tar sands, and solvent cleaning of oil tanks, pipe lines etc.

Secondary recovery of crude oil occurs when the pressure in an oil well has been dissipated and the well has to be flooded with water to establish or renew the water pressure and so displace the oil from rock pores while pushing the oil to recovery wells. If the water used contains an alkyd as hereinbefore described the oil is dispersed more efficiently in the water and hence recovery is improved. For this purpose the alkyd may be conveniently provided in a solvent which may be one of those described above.

The method of dispersing oil in water in accordance with the present invention may be used in the recovery of oil from tar sands such as are found in Athabasca in Canada. The tar-bearing sand is contacted with water and an alkyd as hereinbefore described, suitably in the presence of a hydrocarbon diluent such as a crude oil fraction, e.g. naphtha, which is advantageously a recycle stream from the fractionation of the recovered tar. For both this application and the secondary recovery of crude oil it is desirable to choose an alkyd which provides an emulsion under relatively turbulent conditions but which is sufficiently non-stable for the emulsion eventually to break into water and oil layers when the turbulence is removed.

For solvent cleaning of tanks and other equipment the alkyd is used to disperse oil adhering on the equipment into a mixture of water and a solvent. The solvent may be an oxygenated solvent as described above and may also suitably be a crude-oil distillate fraction such as kerosene or naphtha.

We have found that the more highly branched an alkyd the longer a dispersion lasts before recoalescence, although under turbulent conditions the extent of branching appears to play little part in determining the amount of oil which is dispersed. This facility for formulating dispersing agents of either short term, or long term stability whilst still maintaining high dispersing efficiency greatly increases the range of uses of the dispersing agents according to the invention. As a general guide, the simple relationship defining a theoretical critical gel point proposed by Kahn (J. Polymer Science 49, (152), Feb. 1961) may be used. Thus where $$p_{OH}p_A = ((f'-1)(g'-1))^{-1}$$

$p_{OH}$ being the probability that an OH group will react,
$p_A$ being the probability that an acid group will react,
f' being the average functionality of molecules containing hydroxyl groups, and
g' being the average functionality of molecules containing acid groups.

A preferred alkyd emulsifier for oil slick dispersion is one having a gelling structure, which occurs when the product $p_{OH}p_A$ is unity or less than unity, while for tar sand extraction or secondary oil recovery a product greater than unity is generally more suitable.

In general, for oil slick dispersion we prefer an alkyd which partitions preferentially into the oil phase and/or is of the "gelling type" and/or contains less than 60 weight percent of the water-soluble polyalkylene glycol residue. For tank cleaning, secondary oil recovery and separation of oil from tar sands we prefer to use an alkyd which partitions preferentially into the water phase and/or is of the non-gelling type and/or contains more than 60 weight percent of water-soluble polyalkylene glycol residues.

More than one alkyd resin may be used in the method and composition according to the present invention, particularly two alkyd resins, for instance one may contain less than 50%, e.g. 40% polyalkylene glycol, and the other 50% or more, e.g. 60% by weight polyalkylene glycol.

Compositions according to the present invention may also include other surface active agents, e.g. conventional detergents such as ethylene and/or propylene oxide condensates with $C_6$ to $C_{20}$ alkanols such as isooctanol or tridecanol, ethylene oxide/propylene oxide block copolymers, fatty acid (preferably containing up to 30 carbon atoms), condensates with ethylene oxide, e.g. oleic or tall oil condensates with 5 moles ethylene oxide.

The invention will now be further described with reference to the following Examples, in which a description of the test method used to simulate the dispersion of an oil slick is given in the next paragraph. The test method was used in Examples 1 to 8.

1.5 liters of a 3.5 wt.% solution of sodium chloride were placed in a 4 liter capacity beaker. 1 ml. of weathered Kuwait crude oil was placed on the surface of the water. The required amount of dispersant was added to the oil on the surface via a syringe and the system allowed to stand for 2 minutes on a table attached to a flask shaker, the table being able to be rocked at varying speeds to simulate wave motion. The beaker was rocked at a slow speed (approximately 60 movements a minute) for up to 30 minutes and observations were made at intervals on the behaviour of the oil.

EXAMPLE 1

An alkyd resin was prepared from pentaerythritol, polyethylene glycol (molecular weight 600), glycerol, trimellitic anhydride and soya bean fatty acids in a molar ratio of 0.6 : 1.2 : 0.6 : 1.2 : 30 respectively. The resin had an acid value of 18 to 22 mg. KOH/g., a polyethylene glycol content of 40% and a $p_{OH}/p_A$ value of 0.1.

The alkyd as a 75% solids solution in white spirit was mixed with an equivalent weight of ethylene glycol monobutyl ether to give a 37.5 wt.% solution of the alkyd resin and 0.5 ml. of this solution was added to the oil in the test described above. The oil started to disperse in the water immediately after the addition of the dispersant and after 13 minutes was completely dispersed from the water surface in the form of fine droplets.

EXAMPLE 2

An alkyd resin prepared as in Example 1 was dispersed in hexadecane and applied to the oil as a 37.5% by weight dispersion of the alkyd resin. After 15 minutes agitation the oil was completely dispersed in very small droplets. A finer dispersion was obtained than in Example 1.

EXAMPLE 3

An alkyd resin was prepared from pentaerythritol, polyethylene glycol (molecular weight 600), trimellitic anhydride and soya bean fatty acids in a molar ratio of 0.6 : 2.75 : 1.63 : 3.0 respectively. The resin had an acid value of 18 to 22 mg. KOH/g., and a polyethylene glycol content of 60%. $p_{OH}/p_A = 1$.

One part by weight of this alkyd was mixed with 3 parts by weight of the alkyd prepared in Example 1. The mixed alkyd resins were blended with a mixture of $C_{16}$ ethers and esters and $C_8$ alcohols obtained as a by-product from the hydroformylation of heptenes to $C_8$ alcohols, to give a 20 wt.% solution. 0.25 ml. of this solution was added to the oil under test and after 5 minutes agitation the oil was completely dispersed with a negligible amount floating on the surface. The dispersed droplets were very small and very visible only with difficulty.

EXAMPLE 4

A typical conventional dispersant formulation was made up comprising:

| | |
|---|---|
| Oleyl alcohol ethoxylate (5 moles ethylene oxide/mole oleyl alcohol) | 30 parts by weight |
| Dioctyl sulphosuccinate | 10 parts by weight |
| Ethanol | 30 parts by weight |
| Ethylene glycol monobutyl ether | 30 parts by weight |

This formulation was tested under comparable conditions to the dispersant formulation described in Example 1 when it was found to disperse less of the oil over a 10 minute period.

EXAMPLE 5

The dispersant mixture prepared as in Example 3 was applied to the oil under test as a 33% by weight emulsion in 3.5% by weight salt water. It was found that the effectiveness of the dispersant was not affected by this method of application and a similar rate and extent of dispersion was obtained compared with that described in Example 3.

EXAMPLE 6

The alkyd resin of Example 1 (338 parts) was mixed with the alkyd resin of Example 3 (112 parts), 1535 parts of the mixture of $C_8$ and higher esters, ethers and alcohols, and 270 parts of monoethylene glycol butyl ether. 0.3 ml. of this were applied to the oil as described above, and to a second beaker on the rocking table, 0.15 ml. of the formulation described in Example 4 were added (corresponding to the same amount of active dispersant, i.e. 6% wt. active dispersant based on the wt. of oil). After 2 minutes agitation the oil treated with the alkyd resin dispersant was completely dispersed in contrast to the oil treated with the dispersant of Example 4, in which oil droplets still remained undispersed from the surface.

EXAMPLE 7

An alkyd resin (A) was prepared from pentaerythritol, gylcerol, polyethylene glycol (molecular weight 600), trimellitic anhydride and coconut oil fatty acids in a molar ratio of 0.6 : 0.6 : 1.2 : 1.2 : 3.0 respectively so as to give a polyethylene glycol content of 40%. The resin had an acid value of 18 to 22 mgm. KOH/gram and a $p_{OH}/p_A$ value of 0.1.

A second alkyd resin (b) was prepared in the same manner replacing the coconut oil fatty acids by soyabean fatty acids, and in this instance the polyethylene glycol content was 50%.

15 parts by weight of resin (A) (as a 75% solids solution in white spirit) and 5 parts by weight of resin (B)

(as a 95% solids solution in white spirit) were blended with a mixture of two diluents,
a. 70 parts by weight of a mixture of octanols, dioctylethers, and octyloctanoates which was a by-product of the hydroformylation of mixed heptenes, and
b. 10 parts by weight of the reaction product of propylene oxide and methanol (containing on average 3.7 molecules of propylene oxide per molecule of methanol). The resulting dispersant mixture was emulsified with water containing 3.5% by weight sodium chloride to give an emulsion containing 80 vol. water and 1 ml. of this emulsion was added to the test apparatus described above. After two minutes agitation the oil was dispersed from the surface of the test solution.

EXAMPLE 8

An alkyd resin was prepared from pentaerythritol, glycerol, polyethylene glycol (molecular weight 600), trimellitic anhydride and soyabean fatty acids in a molar ratio of 0.6 : 1.2 : 0.6 : 1.2 : 3.0 respectively. The resin had an acid value of 18 to 22 mg. KOH/g. and a polyethylene glycol content of 40% and a $p_{OH}/p_A$ value of 0.1.

17.5 parts by weight of this resin (as a 75% solids solution in white spirit) and 2.5 parts by weight of resin (B) from Example 7 (as a 95% solids solution in white spirit) were mixed with 70 parts by weight of the mixture of octanols, dioctylethers and octyloctanoates described in Example 1, and 10 parts by weight of the propoxylated methanol also described in Example 1. This mixture was extremely effective in dispersing oil in water when applied as a 10% by volume emulsion in water containing 3.5 wt.% sodium chloride.

EXAMPLE 9

The following evaluation of a composition in accordance with the present invention in dispersing an oil slick was carried out in accordance with the Department of Industry, Warren Spring Laboratory, Report No. LR152(ES) "A Method of Testing Oil Dispersant Chemicals at Sea".

The evaluation took place at sea under wind force 2 to 5, salinity (by salinometer) of 3.5% w/v. and sea temperature 15.5° C. The boat from which the oil was spread travelled at 6 knots/hour and was fitted with a projecting boom equipped with two nozzles. The first nozzle sprayed a Kuwait crude oil into the surface of the sea and was followed by the second nozzle which sprayed a mixture of 90% sea water and 10% dispersant onto the oil slick so produced. A surface-breaker board was towed after the boat so as to create a turbulent surface conditions and so facilitate dispersion of the oil.

The rate of oil flow at the start of the test was 1 gall/min. accompanied by a flow of dispersant/sea water mixture of 3.7 galls/minute. The oil flow rate was then increased by 0.5 gallon steps keeping the dispersant flow constant until interference patterns were noted on the surface of the water by an observer boat following behind. The oil flow was then reduced in 0.5 gallon steps until the interference patterns disappeared indicating complete dispersion of the oil.

The maximum rate of oil flow at which the sea surface remained clear was 5 galls, i.e. 0.074 pts. of dispersant dispersed 1 pt. of oil. In a comparative test using a conventional dispersant, i.e. 10% of a tall oil acid ethoxylated with 5 molecules ethylene oxide, 10% oleic acid ethoxylated with 5 molecules ethylene oxide and 80% kerosine, 1 part of oil required 1 part of dispersing agent to disperse it.

The dispersant in accordance with the present invention which was used in this test consisted of 75% of a mixture of ethers, esters and alcohols obtained as a by-product in the hydroformylation of mixed heptenes (58% di-octylether, 24% $C_{16}$ esters, 14% $C_{16}$ alcohols), 5% of the reaction product of propylene oxide with methanol (containing on average 3.7 molecules of propylene oxide per molecule of methanol), 17.5% of an alkyd produced from pentaerythritol, glycerol, polyethylene glycol (molecular weight 600), trimellitic anhydride and tall oil acids (acid value of the alkyd 15.25 mgm KOH/gm, polyethylene glycol content 40%), and 2.5% of an alkyd produced from pentaerythritol, glycerol, polyethylene glycol (molecular weight 600,), trimellitic anhydride and tall oil acids (acid value of the alkyd 15.25 mgm KOH/gm., polyethylene glycol content 50%).

EXAMPLE 10

10 grams of Athabasca tar sand (containing 12 – 13% by weight bitumen) was placed in a stoppered separating funnel with 9 grams of distilled water and 1 gram of naphtha containing 0.01 gram of an alkyd in accordance with the present invention. The funnel was shaken for 5 minutes and then allowed to stand when a separation into three layers took place. The top layer contained the naphtha and bitumen, the middle layer, the water and the bottom layer, the sand. More than 95% by weight of the bitumen was removed from the sand. Although we do not wish to be limited in any way by this explanation we believe that the alkyd provides a dispersion of the naphtha in the water and so promotes the extraction of the bitumen by the naphtha. It may also facilitate the removal of the bitumen from the sand. An important advantage lies in the fact that after standing the oil/water dispersion separates so that the naphtha and bitumen may be easily removed. The alkyd therefore achieves two desirable ends, i.e. it disperses the naphtha in the water under conditions of shear but allows the dispersion to separate when the system is quiescent.

The alkyd used in this Example was prepared from tall oil fatty acids (3 moles), pentaerythritol (0.61 mole), polyethylene glycol (molecular weight 800), (2.15 moles), trimellitic anhydride (1.23 mole). The alkyd had a polyethylene glycol content of 61%, an acid value between 15 and 25 mgm KOH/gm., annd a $p_{OH}p_A$ value of 1.215.

EXAMPLE 11

A mixture was made up comprising, 10% by weight of the alkyd described in Example 10; 50% by weight of the hydroformylation by-product described in Example 9; 40% by weight of the propylene oxide/methanol reaction product described in Example 9. 1 part of this mixture was mixed with 10 parts of water and the resulting formulation subjected to a simulated tank cleaning test in which it was sprayed onto a metal plate smeared with Kuwait crude oil. The formulation cleared the oil from the plate even at ambient temperature.

EXAMPLES 12 TO 19

In these Examples a number of different alkyd resins were evaluated as oil slick dispersants by the method described in Example 3 using the inert carrier therein described. The alkyds used had the following composition:

EXAMPLE 12

Pentaerythritol, polyethylene glycol (m. wt. 800), glycerol, phthalic anhydride, soyabean oil fatty acids, in a molar ratio of 1 : 1 : 1 : 3.2 : 3.0 respectively. The resin had an acid value of 14.7 mgm. KOH/g., a polyethylene glycol content of 40%, a fatty acid content of 36.8% and a $p_{OH}/p_A$ value of 1.0.

EXAMPLE 13

Pentaerythritol, glycerol, polyethylene glycol (m. wt. 200), polyethylene glycol (m.wt. 400), polyethylene glycol (m.wt. 600), polyethylene glycol (m.wt. 800), polyethylene glycol (m.wt. 1500), trimellitic anhydride, tall oil fatty acids, in a molar ratio of 0.6 : 0.6 : 0.12 : 0.24 : 0.48 : 0.24 : 0.12 : 1.2 : 3.0 respectively. The resin had an acid value of 18.0, a polyethylene glycol content of 39.7%, a fatty acid content of 45.8% and a $p_{OH}/p_A$ value of 1.0.

EXAMPLE 14

Pentaerythritol, polyethylene glycol (m.wt. 600), phthalic anhydride, maleic anhydride, soyabean oil fatty acids in a molar ratio of 1.09 : 1.2 : 0.5 : 0.9 : 3.0 respectively. The resin had an acid value of 11, a polyethylene glycol content of 39.4 and a $p_{OH}/p_A$ value of 0.77 (assuming all the maleic anhydride reacted with the soyabean oil fatty acid unsaturation to give a trifunctional acid).

EXAMPLE 15

Pentaerythritol, polyethylene glycol (m.wt. 600), phthalic anhydride, maleic anhydride, soyabean oil fatty acids, in a molar ratio of 1.05 : 1.2 : 0.5 : 0.9 : 3.0 respectively. The resin had an acid value of 9.2, a polyethylene glycol content of 40%, a fatty acid content of 47.4% and a $p_{OH}/p_A$ value of 0.77 (making the same assumption as in Example 14).

EXAMPLE 16

Pentaerythritol, glycerol, polyethylene glycol, (m.wt. 800), phthalic anhydride, dimerised fatty acids (EMPOL 1024 — EMPOL is a trademark), tall oil fatty acids in a molar ratio of 0.6 : 0.6 : 1.2 : 0.9 : 1.4 : 2.0 respectively. The resin had an acid value of 15.3, a polyethylene glycol content of 38.7%, a fatty acid content of 55.3% and a $p_{OH}/p_A$ value of 0.95.

EXAMPLE 17

Pentaerythritol, polyethylene glycol (m.wt. 400), trimellitic anhydride, tall oil fatty acids, in a molar ratio of 1.0 : 2.0 : 1.0 : 3.0 respectively. The alkyd had an acid value of 32.4, a polyethylene glycol content of 40%, a fatty acid content of 43% and a $p_{OH}/p_A$ value of 1.2.

EXAMPLE 18

Pentaerythritol, mono-methylether of polyethylene glycol (m.wt. 750), phthalic anhydride, maleic anhydride, soyabean oil fatty acids, in a molar ratio of 1.5 : 0.7 : 1.3 : 0.7 : 3.0 respectively. The alkyd had an acid value of 9.3, a polyethylene glycol content of 30.5%, a fatty acid content of 51% and a $p_{OH}/p_A$ value of 0.8 (making the same assumptions as in Example 14).

EXAMPLE 19

Pentaerythritol, glycerol, polyethylene glycol (molecular weight 600), trimellitic anhydride, lauric acid, in a molar ratio of 1.1 : 1.1 : 1.5 : 2.0 : 5.0 respectively. The alkyd had an acid value of 18, a polyethylene glycol content of 40% and a $p_{OH}/p_A$ value of 0.925.

The alkyds were tested by the method described in Example 3, the time taken to form a fine, stable dispersion of oil droplets in water being measured. The times for the various Examples were as follows:

| Example | |
|---|---|
| 12 | 2 mins |
| 13 | 1 to 2 mins |
| 14 | 5 mins |
| 14 | 5 mins |
| 16 | 1 min |
| 17 | 2 mins |
| 18 | 5 mins |
| 19 | 5 mins |

EXAMPLE 20

100 grams of Athabasca tar sand were placed in an 8 ounce jar fitted with a sealing screw cap and to this was added a solution of 0.019 gram of an alkyd resin in 100 grams distilled water followed by 1 gram of naphtha. The jar and contents were slowly rotated on a laboratory bottle roller (22 r.p.m.) for 10 mins. at ambient temperature (22° C). The jar contents were then allowed to stand for 15 minutes after which time four distinct layers were obtained: a bottom sand layer covered by a silt layer covered by an aqueous layer (essentially free of collodial clay and dispersed bitumen) and a top layer of creamy bitumen/naphtha.

After drying, the treated sand was extracted with chloroform which showed that only 12% of the original bitumen remained on the sand, i.e. there was an 88% recovery.

The alkyd used in this Example was made from pentaerythritol, trimellitic anhydride, polyethylene glycol (m. wt. 1500) and tall oil fatty acids, in a molar ratio of 0.6 : 1.2 : 2.1 : 3.0 respectively. The alkyd had an acid value of 18.9, a polyethylene glycol content of 74.7% by weight, a fatty acid content of 20.2% by weight, a fatty acid content of 20.2% by weight and a $p_{OH}/p_A$ value of 1.23.

EXAMPLE 21

Test plates of bonded and primed steel were prepared by immersing the plates in weathered Kuwait crude oil and draining to leave a continuous dark oily film.

These plates were excellently cleaned (no oily streaks or patches remaining) after 10 minutes spraying with either of the following emulsions:
- 20 mls. of the hydroformylation by-product described in Example 9.
- 180 mls. distilled water.
- 0.20 gram of the alkyd described in Example 11 or the alkyd described in Example 20.

On standing, the emulsions which contained the washed-off Kuwait crude separated within 15 minutes to give an upper layer containing the Kuwait crude and hydroformylation by-product and a bottom aqueous layer containing the major part of the alkyd but no visible sign of the crude oil.

We claim:

1. A method of oil disposal or recovery which comprises contacting an oil layer in the form of a slick on a water surface or adhering to sand, rocks, tanks, pipelines and other equipment with water and an alkyd resin which is the condensation product of a polybasic acid and a polyhydric alcohol and in which at least part of the polyhydric alcohol component of said resin comprises a polyalkylene glycol of molecular weight 100 to 10,000 selected from the group consisting essentially of polyethylene glycol, polypropylene glycol, poly(ethylene/propylene)glycol and poly(ethylene/butylene) glycol and polyalkylene glycol comprising at least 5 % by weight of the alkyd resin and said polyalkylene glycol being soluble in water whereby the oil is dispersed in the water wherein said alkyd resin is dissolved or dispersed in an inert liquid carrier.

2. A method as claimed in claim 1 in which the alkyd resin includes a mono-basic acid.

3. A method as claimed in claim 2 in which the polybasic acid comprises an aliphatic or aromatic dibasic acid containing up to 20 carbon atoms or a tribasic aromatic acid containing up to 20 carbon atoms.

4. A method as claimed in claim 3 in which the polyalkylene glycol is polyethylene glycol, the polyhydric alcohol is selected from the group consisting of mono-, di and tri-ethylene glycol, mono-, di and tri-propylene glycol, mono- di and tributylene glycol, neopentyl glycol, glycerol, trimethylol propane, trifmethylol ethane, pentaerythritol, dipentaerythritol, sorbitol, polypropylene glycol and polybutylene glycol, the monobasic acid is selected from the group consisting of tall oil acids, iso-octanoic acid, 2-ethylhexanoic acid, isodecanoic acid, lauric acid, pelargonic acid and acids derived from linseed oil, soyabean oil, soya oil, whale oil, dehydrated castor oil, tung oil, fish oil, safflower oil, oiticica oil, cottonseed oil and coconut oil, and the alkyd resin contains 25 to 85% by weight of the polyethylene glycol.

5. A method as claimed in claim 4 in which the oil and water are contacted with the alkyd resin by applying to the oil and water the alkyd resin dissolved or dispersed in an inert liquid carrier, selected from the group consisting of aliphatic and cycloaliphatic hydrocarbons containing 6 to 20 carbon atoms and hydrocarbon esters, ethers and alcohols containing 6 to 30 carbon atoms.

6. A method as claimed in claim 5 in which the liquid carrier is a mixture of alcohols and/or ethers and esters obtained as a by-product in the hydroformylation of an olefine.

7. A method as claimed in claim 2 in which the monobasic acid is an aliphatic saturated or unsaturated acid containing up to 30 carbon atoms.

8. A method as claimed in claim 1 in which the polyalkylene glycol is polyethylene glycol.

9. A method as claimed in claim 1 in which the polyalkylene glycol is a poly(ethylene/propylene) glycol.

10. A method as claimed in claim 1 in which a combination of two alkyd resins is used in which each alkyd resin comprises a polyalkylene glycol component, one resin comprising less than 50% by weight polyalkylene glycol and the other resin containing 50 or more % by weight polyalkylene glycol.

11. A method as claimed in claim 1, wherein said alkyd resin is the reaction product of a polybasic acid, and a polyhydric alcohol, at least part of said polyhydric alcohol being a polyalkylene glycol, wherein said polyhydric alcohol contains up to 20 carbon atoms and said polybasic acid contains up to 20 carbon atoms.

12. A method as claimed in claim 1, wherein said alkyd resin contains 5–85% by weight of polyalkylene glycol.

13. A method as claimed in claim 12, wherein said alkyd resin contains 25 to 85% by weight of alkylene glycol.

* * * * *